Jan. 26, 1937.     P. BARRY     2,069,056
STUFFING BOX PACKING
Filed March 28, 1935
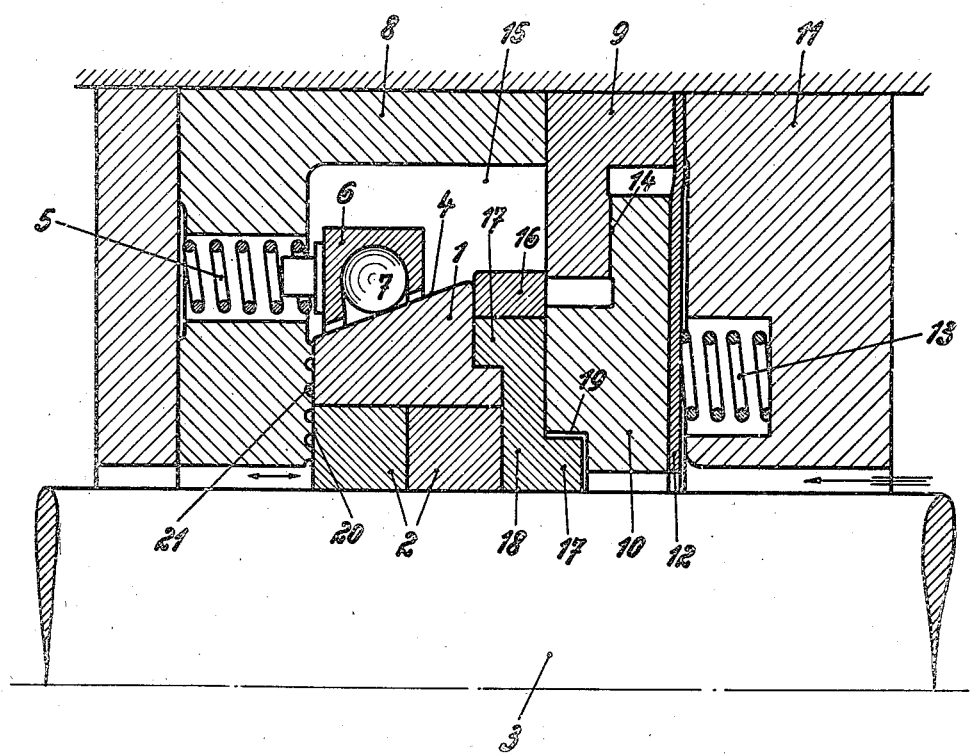
Inventor:
Paul Barry Patented Jan. 26, 1937

2,069,056

UNITED STATES PATENT OFFICE 2,069,056

STUFFING BOX PACKING

Paul Barry, Essen-on-the-Ruhr, Germany

Application March 28, 1935, Serial No. 13,495
In Germany February 22, 1934

5 Claims. (Cl. 286—23)

In case of metallic stuffing boxes comprising one or several packing chambers and serving for packing piston rods, turbine shafts or the like it is important for the packing rings to be capable of moving transversely to their axis so as to follow fluctuations of the piston rod or shaft to be packed and thereby protect the latter against wear due to friction. It is therefore necessary to keep away injurious cylinder pressure from the chambers carrying the packing rings, or to reduce it to a harmless minimum, so as not to endanger the flexibility of the packing rings.

The metallic stuffing boxes hitherto in use are open to the objection that in the packing chamber nearest the cylinder the full cylinder pressure and, in case of boxes having several packing chambers, in the successive chambers gradually decreasing pressures appear in the spaces behind the packing rings which thus knock considerably against the piston rod or shaft to be packed. The result is that the rings are rapidly worn down at their packing surfaces and have to be exchanged and, furthermore, that, owing to the unyielding application pressure of the rings, the piston rod or shaft to be packed is subjected to considerable uneven wear, so that it must frequently be reground. Frequent regrinding, however, will render it useless very soon, which involves the loss of time and, above all, high costs. The problem to be solved, therefore, is to provide a stuffing box, in which the mobility of the packing rings is maintained and cylinder pressure is kept away from the chambers containing the rings or reduced to a harmless minimum.

According to the invention, this problem is solved by the provision of a metallic stuffing box having one or several packing chambers and, as described below, being constructed so that highest cylinder pressures are taken up by suitable means before passing to the first packing chamber and the chambers are sealed against harmful pressure. The invention attains its object by making one of the chamber walls disposed vertically to the axis of the piston rod or shaft of two parts and elastic and arranging this elastic wall on the pressure side for the purpose of causing the elastic wall automatically to press against the packing ring in the first chamber, owing to the pressure prevailing in the cylinder. Between the yielding wall and the packing ring disposed in the chamber a three part ring provided with projections and held together by a tightening ring is preferably interposed whereby the packing effect, as well as the application pressure of the packing rings relative to the piston rod or shaft, is considerably increased.

A particularly advantageous effect is obtained if in case of packing rings acting by springiness the outer surface of the pressure ring carrying the packing rings is inclined and spring-actuated balls displaceable in the direction of the axis of the piston rod or shaft are provided in the packing chamber, so that by point contact of the adjacent balls over the entire circumference of the pressure ring a steady application pressure of the packing rings, by means of the compression springs actuating the balls, is effected towards the shaft in a perfectly elastic and springy manner.

In the accompanying drawing, by way of example, one form of the invention is shown diagrammatically, which, for the sake of simplicity, shows only one packing chamber in a metallic stuffing box.

Referring to the drawing, 1 designates the compression rings ground into the chamber and carrying the packing rings 2. The rings 1 are spring-actuated and lightly press the packing rings 2 against the piston rod or shaft 3 so as to pack them well while the packing rings 2 are capable of yielding to any fluctuation of the piston rod or shaft. To insure absolutely concentric cooperation between the packing rings 2 and the piston rod or shaft 3 to be packed the outer surface 4 of the ring 1 is preferably inclined and placed under the influence of the balls 7 arranged in the annular casing 6 and controlled by the spring 5, so that over the entire circumference of the compression ring 1 the adjacent balls 7, by point contact with the compression ring by means of the springs 5, elastically transmit their forces to the packing rings 2 and thus to the piston rod or shaft 3.

The chamber containing the compression ring 1 comprises the rigid angular casing 8 and a wall closing the chamber space and consisting of a fixed part 9 and a movable part 10 facing the piston rod or shaft 3 to be packed. The part 9 is firmly fixed between the rigid chamber member 8 and a ring 11, and the part 10 is carried and influenced by an elastic diaphragm 12 fixed between the part 9 and the ring 11. The diaphragm 12 is preliminarily tensioned by the compression springs 13 arranged in the ring 11 and takes up the cylinder pressure, whereby the two portions 9 and 10 are firmly pressed together at their contacting surface while the mobility of the part 10 is maintained, for which purpose the contacting surfaces 14 of the two wall parts 9 and 10 are ground in. Owing to the pressure on the wall portion 10 by the diaphragm 12 influenced by the cylinder pressure and the springs 13, the wall 10, reacts against the ring 1 and thus seals the chamber space 15 against cylinder pressure. It is advisable to interpose between the yielding wall and the pressure ring 1 or packing ring 2 a three-part ring 18 held together by a tightening ring 16 and provided with projections 17 to increase the packing effect, as the pressure developing in the clearance 19 behind the nose 17 of the ring 18 presses the ring 18 and thereby also the compression ring 1 firmly though yieldingly towards the piston rod or shaft to be packed, the ring 18 engaging the compression ring 1 in a nose-like fashion to drive it.

The construction described keeps away cylinder pressure injuriously and radially acting upon the packing rings 2 from the chamber space 15. Only some harmless axial clearance pressure, unavoidably caused by the necessary play between the piston rod or shaft 3 and the elastic wall 10, 12, will be present and reduced to a minimum. This slight axial pressure appears only in the first packing chamber, and in stuffing boxes having a plurality of packing chambers arranged one behind the other the other chambers will therefore be pressureless.

To facilitate the escape of some slight harmless pressure that might have entered the chamber space 15, part 8 is provided at its point of contact with the pressure ring 1 or packing ring 2 with a spiral clearance 21 extending over the whole surface of contact and having its upright faces 20 ground on. On escaping from the chamber space 15, the pressure must therefore pass through the spirally extending clearance 21 and while within this clearance press against the compression ring 1 or packing ring 2 against the pressure of the cylinder, so that it has an axially balancing effect and, further, prevents the pressure rings from sticking to the wall.

The invention provides a stuffing box packing capable of meeting all requirements, even in case of packing for maximum pressures, and all parts thereof are subjected only to normal wear. While the mobility of the packing rings is maintained, the packing keeps away all injurious radially and partly axially acting pressure from the packing chambers, so that the piston rods or shafts packed by the stuffing box according to the invention are effectively protected against wear and the hitherto frequently required grinding and subsequent exchanging of piston rods and shaft can be dispensed with, whereby a considerable saving in time and money is effected.

Furthermore, by keeping away harmful pressure from the packing chamber the entrance of dirt and, above all, heat is prevented, so that the stuffing box packing is protected against soiling and deformation by heat and, with good lubrication, the mobility thereof is not interfered with, with the result that the packing has a much longer life.

As the invention provides for keeping already the first packing chamber practically free from pressure, the stuffing boxes may have a much shorter overall length.

What I claim is:

1. A stuffing box for piston rods, shafts or the like, comprising a packing chamber, spring-actuated compression rings in said chamber and packing rings carried by said compression rings and pressed by them against the member to be packed, one of the chamber walls disposed around said member to be packed being spring pressed for automatically pressing against the packing rings and directly faces the pressure side for keeping injurious pressure and dirt away from the inside of the packing chambers and increasing the life of the member packed.

2. A stuffing box for piston rods, shafts or the like, comprising a packing chamber, spring-actuated compression rings in said chamber, packing rings carried by said compression rings and pressed by them against the member to be packed, said chamber comprising a rigid wall and a wall having a fixed external part and a movable internal part surrounding the member to be packed, and a spring-actuated diaphragm adapted to influence said movable part and to take up cylinder pressure for causing said two wall portions to be pressed firmly together to press the said wall against the packing rings.

3. A stuffing box according to claim 2, having a ring consisting of several parts and being provided with projections, a tightening ring for holding together the parts of said first ring, said first ring being interposed between the packing rings and the movable wall and engaging with its projections the compression rings and the movable portion of the movable wall.

4. A stuffing box according to claim 2, wherein the outer face of the compression ring is inclined and spring-actuated balls displaceable in the direction of the axis of the member to be packed are provided in the packing chamber and press against the inclined face for elastically transmitting their forces to the packing rings.

5. A stuffing box according to claim 2, comprising a ring consisting of several parts and provided with projections, a tightening ring for holding together said first ring, said first ring being interposed between the packing rings and the movable wall and engaging with its projections the compression ring and the movable portion of the wall, the rigid part of the packing chamber being spirally recessed at its point of contact with the packing rings to facilitate the escape of pressure from the chamber space, an inclined outer face on the compression ring and spring-actuated balls displaceable in the direction of the axis of the member to be packed in the packing chamber, and pressing against the inclined face for elastically transmitting their forces to the packing rings, all contacting packing faces being ground relative to one another.

PAUL BARRY.